(12) United States Patent
Lindenman et al.

(10) Patent No.: US 7,264,259 B2
(45) Date of Patent: Sep. 4, 2007

(54) FIFTH WHEEL HITCH ASSEMBLY

(75) Inventors: Thomas W. Lindenman, South Bend, IN (US); Anthony S. Roberts, Granger, IN (US); Richard W. McCoy, Granger, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

(21) Appl. No.: 10/465,773

(22) Filed: Jun. 19, 2003

(65) Prior Publication Data

US 2003/0209878 A1    Nov. 13, 2003

Related U.S. Application Data

(63) Continuation-in-part of application No. 10/189,641, filed on Jul. 3, 2002, now abandoned.

(60) Provisional application No. 60/303,175, filed on Jul. 5, 2001.

(51) Int. Cl.
B62D 53/08    (2006.01)

(52) U.S. Cl. .................................. 280/438.1

(58) Field of Classification Search ........ 280/433–435, 280/437, 438.1
See application file for complete search history.

(56) References Cited

U.S. PATENT DOCUMENTS

| | | | |
|---|---|---|---|
| 1,958,723 A * | 5/1934 | Spencer | ........... 280/438.1 |
| 1,996,162 A | 4/1935 | Lubbers | |
| 2,027,990 A | 1/1936 | Lubbers | |
| 2,041,124 A | 5/1936 | Francis | |
| 2,289,079 A | 7/1942 | Seyferth | |
| 2,507,616 A | 5/1950 | Stephen | |
| 2,513,117 A | 6/1950 | Stephen | |
| 2,543,749 A | 3/1951 | Walther | |
| 2,621,056 A | 12/1952 | Kayler | |
| 2,680,627 A | 6/1954 | Johnson et al. | |
| 2,749,144 A | 6/1956 | Kayler | |
| 2,778,657 A | 1/1957 | Chaplin | |
| 2,779,605 A | 1/1957 | Braunberger | |
| 2,799,516 A | 7/1957 | Greenway | |
| 2,809,851 A | 10/1957 | Beck | |
| 2,819,096 A | 1/1958 | Sencenich | |
| 2,856,203 A | 10/1958 | Kayler | |
| 2,860,891 A | 11/1958 | Ramun | |
| 2,900,194 A | 8/1959 | De Lay | |
| 2,925,286 A | 2/1960 | Hodges, Jr. et al. | |
| 2,977,137 A | 3/1961 | Durham | |

(Continued)

FOREIGN PATENT DOCUMENTS

DE    2121876    12/1972

(Continued)

Primary Examiner—Kevin Hurley
(74) Attorney, Agent, or Firm—McDonald Hopkins LLC; Robert H. Earp, III

(57) ABSTRACT

A fifth wheel hitch assembly includes a mounting assembly, an arched base assembly, a head assembly and a jaw assembly carried by the head assembly. The jaw assembly includes a stepped jaw body. The head assembly includes a single piece, weldless and seamless skid plate. The base assembly is modular and includes a pair of legs and a central housing. The base assembly includes feet that are received in cooperating sockets carried by the mounting assembly. The feet may be locked in those sockets.

26 Claims, 7 Drawing Sheets

U.S. PATENT DOCUMENTS

| | | |
|---|---|---|
| 2,985,463 A | 5/1961 | Geerds |
| 3,073,624 A | 1/1963 | Thomas |
| 3,112,936 A | 12/1963 | Cole et al. |
| 3,170,716 A | 2/1965 | Walther et al. |
| 3,171,672 A | 3/1965 | Dalton |
| 3,198,549 A | 8/1965 | Martin |
| 3,318,616 A | 5/1967 | Fontaine et al. |
| 3,402,944 A | 9/1968 | Day |
| 3,584,899 A | 6/1971 | Gottler et al. |
| 3,606,384 A | 9/1971 | Fontaine et al. |
| 3,630,545 A | 12/1971 | Fontaine |
| 3,640,549 A * | 2/1972 | Neff et al. ............ 280/435 |
| 3,746,369 A | 7/1973 | Neff |
| 3,844,584 A | 10/1974 | Fontaine |
| 3,847,414 A | 11/1974 | Madura |
| 3,861,709 A | 1/1975 | Mulcahy et al. |
| 3,888,514 A | 6/1975 | Klein |
| 3,893,710 A | 7/1975 | Madura |
| 4,017,095 A | 4/1977 | Best |
| 4,134,601 A | 1/1979 | Propst |
| 4,429,892 A | 2/1984 | Frampton et al. |
| 4,477,100 A | 10/1984 | Elyakim |
| 4,505,344 A | 3/1985 | Hobbs et al. |
| 4,614,355 A | 9/1986 | Koch |
| 4,721,323 A | 1/1988 | Czuk et al. |
| 4,892,324 A | 1/1990 | Spencer et al. |
| 4,928,987 A * | 5/1990 | Hunger ............ 280/435 |
| 4,946,183 A | 8/1990 | Benson et al. |
| 5,120,080 A | 6/1992 | Ritter |
| 5,509,682 A | 4/1996 | Lindenman et al. |
| 5,516,137 A | 5/1996 | Kass et al. |
| 5,529,329 A | 6/1996 | McCoy |
| 5,707,070 A | 1/1998 | Lindenman et al. |
| 5,839,745 A * | 11/1998 | Cattau et al. ............ 280/434 |
| 6,170,850 B1 * | 1/2001 | Works ............ 280/433 |
| 6,179,316 B1 * | 1/2001 | Sibley, Jr. ............ 280/434 |
| 6,199,889 B1 * | 3/2001 | Golembiewski et al. .... 280/433 |
| 2003/0015855 A1 * | 1/2003 | McCoy et al. ............ 280/433 |

FOREIGN PATENT DOCUMENTS

| | | |
|---|---|---|
| EP | 38928 | 11/1981 |

* cited by examiner

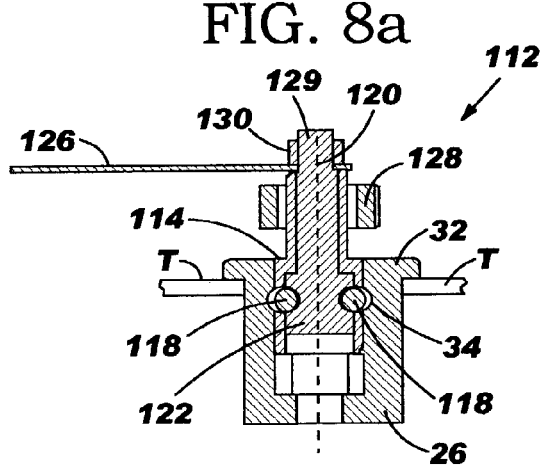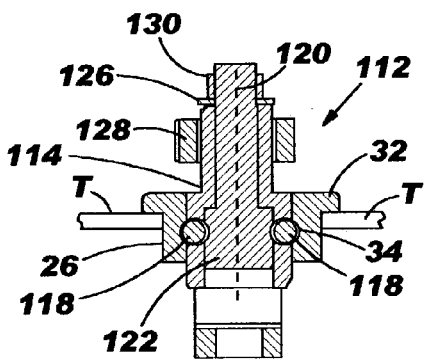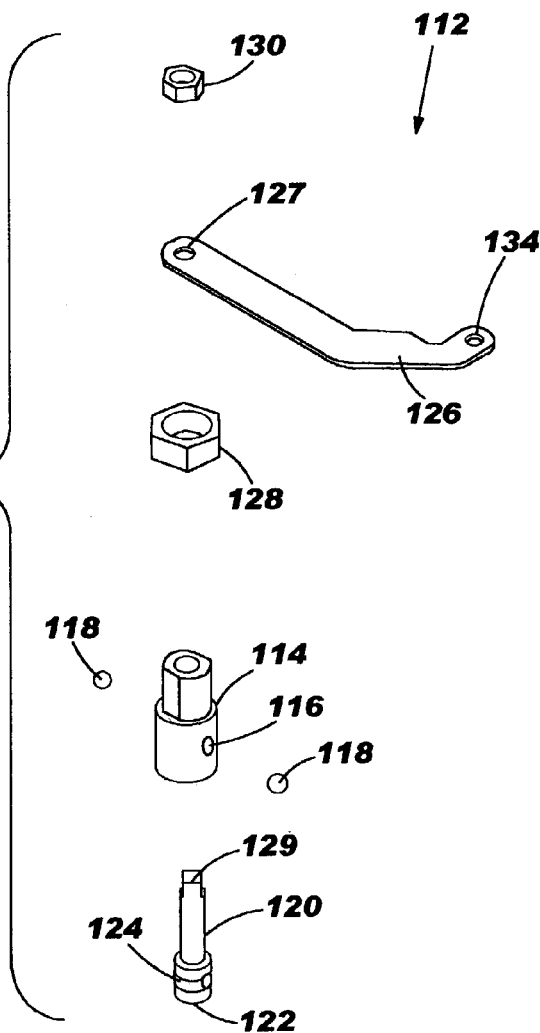

FIFTH WHEEL HITCH ASSEMBLY

This application is a continuation-in-part of U.S. patent application Ser. No. 10/189,641, filed Jul. 3, 2002 now abandoned, entitled "Fifth Wheel Hitch Assembly With Improved Jaw Mechanism" which claims the benefit of U.S. Provisional Patent Application Ser. No. 60/303,175 filed on Jul. 5, 2001.

TECHNICAL FIELD

The present invention relates generally to the trailer towing field, and more particularly, to an improved fifth wheel hitch assembly incorporating a number of novel features and enhancements over the prior art.

BACKGROUND OF THE INVENTION

Fifth wheel hitches are well known to those in the trailer towing field. Various models of fifth wheel hitches have been manufactured and sold by Reese Products, Inc. The fifth wheel hitches generally include base and mounting assemblies that are held in the bed and mounted to the frame of a pick up truck. The base assembly supports a head assembly including a skid plate and a locking jaw mechanism for securing the king pin of the trailer being towed in proper position with the weight of the trailer properly supported on the skid plate. An example of a fifth wheel hitch assembly incorporating such a structural arrangement is found in U.S. Pat. No. 4,721,323 to Czuk et al.

The present invention relates to an improved fifth wheel hitch assembly including a number of product enhancements. Those enhancements include, but are not limited to, (a) a king pin envelope with a rolled edge for increased pin bearing area and added strength; (b) a modular, arched base assembly with two legs and a central housing section; (c) a new foot arrangement for docking the base assembly to the mounting assembly; and (d) a wide funnel or throat for easier trailer alignment and simple trailer connection.

SUMMARY OF THE INVENTION

In accordance with the purposes of the present invention as described herein, a fifth wheel hitch assembly is provided for towing a trailer behind a towing vehicle. The fifth wheel hitch assembly includes a base assembly and a head assembly carried on the base assembly. Further, the fifth wheel hitch assembly is characterized by the head assembly including a skid plate with a hidden cavity, a jaw assembly carried by the skid plate and held in the hidden cavity and a pair of opposed pivot guides carried by the head assembly and held in the hidden cavity.

The skid plate includes a top wall and a downwardly depending peripheral skirt defining the hidden cavity beneath the top wall. Additionally, the skid plate includes a throat for receiving a king pin of a trailer. The downwardly depending peripheral skirt extends around that throat.

The fifth wheel hitch assembly also includes a mounting platform carried by the skid plate and held in the hidden cavity. The jaw assembly and the pair of opposed pivot guides are connected to the mounting platform. The mounting platform includes first and second upstanding sidewalls. The first pivot guide is mounted to the first upstanding sidewall and the skirt and the second pivot guide is mounted to the second upstanding sidewall and the skirt.

The base assembly includes a first trunnion engaging the first pivot guide and a second trunnion engaging the second pivot guide. The first pivot guide includes a first set of opposed apertures and the second pivot guide includes a second set of opposed apertures. A first connecting pin is received in the first set of apertures and captures the first trunnion in the first pivot guide. A second connecting pin is received in the second set of apertures and captures the second trunnion in the second pivot guide. Further the first trunnion includes a first groove receiving the first connecting pin and the second trunnion includes a second groove receiving the second connecting pin.

The jaw assembly includes a jaw pivotally mounted to the mounting platform, a control handle and a link for pivotally connecting the control handle to the jaw. The jaw is displaceable by manipulation of the control handle between a first position for locking a trailer king pin in the head assembly and a second position for releasing the trailer king pin from the head assembly.

The jaw includes a semicircular king pin gripping surface, a first aperture and a second aperture. The king pin gripping surface is stepped. The first pivot pin is received in the first aperture and pivotally connects the jaw to the mounting platform. The second pivot pin is received in the second aperture and connects the jaw to the connecting link. A third pivot pin pivotally connects the connecting link to an intermediate portion of the control handle. The fifth wheel hitch assembly also includes a spring having a first end connected to the jaw and a second end connected to either the mounting platform or the skid plate. This spring functions to bias the jaw into the first position.

The base assembly includes a first leg, a second leg and a central housing. The base assembly further includes a rocker pivotally connected to the central housing. More specifically, the central housing includes a first end wall, a second end wall, a first sidewall and a second side wall. A rocker pivot pin pivotally connects the rocker to the first and second end walls so as to allow the rocker to pivot freely from side-to-side. First and second trunnions are carried on the rocker.

The first sidewall has a first series of spaced mounting points and the second sidewall has a second series of spaced mounting points. The first leg has a first mounting wall and the second leg has a second mounting wall. A first fastener secures at least a first mounting point of the first series of spaced mounting points to the first mounting wall. A second fastener secures at least a second mounting point of the second series of spaced mounting points to the second mounting wall. In this way depending upon which of the series of spaced mounting points is used, it is possible to provide height adjustment to the fifth wheel hitch assembly.

Still further describing the invention the first leg includes a first pair of mounting feet and the second leg includes a second pair of mounting feet.

In addition, the fifth wheel hitch assembly includes a mounting assembly having a first mounting bracket, a second mounting bracket, a first cross bar extending between the first and second mounting brackets and a second cross bar extending between the first and second mounting brackets. The first cross bar carries a first pair of mounting sockets and the second cross bar carries a second pair of mounting sockets. The first and second pair of mounting feet are received in the first and second pair of mounting sockets.

Still other features and advantages of the present invention will become readily apparent to those skilled in this art from the following description wherein there is shown and described several preferred embodiments of this invention simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain certain principles of the invention. In the drawings:

FIG. 7 is an exploded perspective view of one of the mounting feet of the present invention; and FIGS. 8a and 8b are detailed cross sectional views illustrating the locking of a mounting foot on the leg on the base assembly in the socket on the mounting assembly that is secured to the frame of the vehicle.

Figure 1:
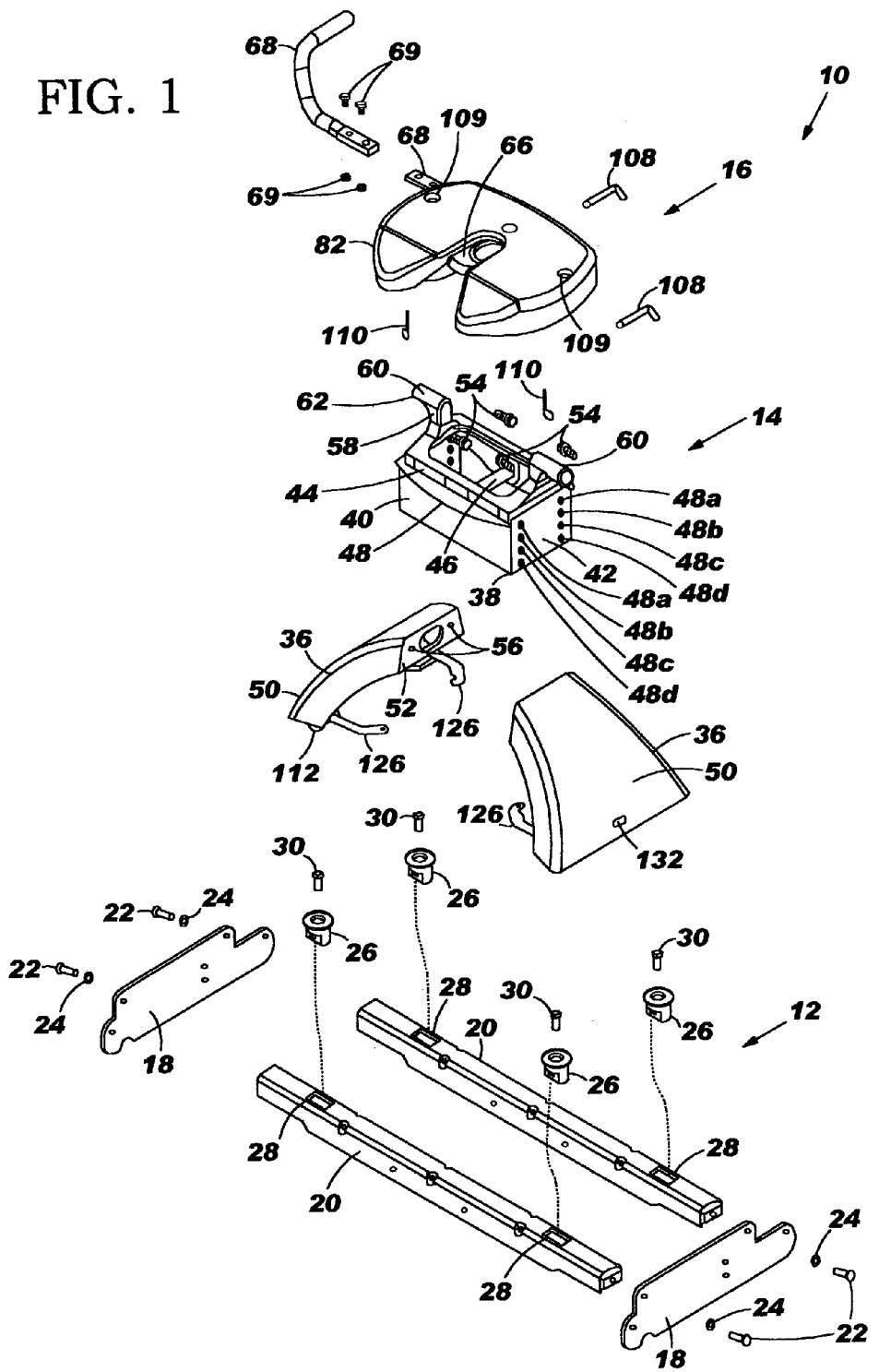
FIG. 1 is an exploded perspective view of the fifth wheel hitch assembly of the present invention.

Reference will now be made in detail to the present preferred embodiment of the invention, an example of which is illustrated in the accompanying drawings.

DETAILED DESCRIPTION OF THE INVENTION

Reference is now made to the drawing figures illustrating the fifth wheel hitch assembly 10. That assembly 10 includes a mounting assembly, generally designated by reference numeral 12, an arched base assembly, generally designated by reference numeral 14, and a head assembly, generally designated by reference numeral 16. As illustrated the mounting assembly 12 includes first and second mounting brackets 18 connected together by a pair of cross bars 20 by means of bolts 22 and lock washers 24. Of course, while bolts 22 and lock washers 24 are shown, other types of fasteners (e.g. screws) or fastening processes (e.g. welding) could be utilized. The mounting assembly 12 may be secured through the mounting brackets 18 to the frame (not shown) of a vehicle (see FIGS. 8a and 8b) so that the cross bars 20 rest on the vehicle frame immediately below the bed T of that vehicle. This arrangement allows both unobstructed use of the bed and mounting of equipment other than a fifth wheel hitch (e.g. a goose neck hitch or cargo anchors). Any appropriate fasteners or fastening processes known in the art to be useful for this purpose may be utilized.

Each of the cross bars 20 includes a pair of feet receiving socket elements 26 mounted in apertures 28 by means of bolts 30 that threadedly engage the cross bars. Advantageously, the installation of the socket elements 26 may be made by one person from above the bed for convenience. Each of the sockets 26 includes an upper lip or flange 32 and an internal annular race 34. The upper lip or flange 32 is substantially flush with the top of the bed to provide an enhanced aesthetic appearance and so as not to obstruct use of the bed.

The base assembly 14 is of modular configuration and comprises first and second arched legs 36 and a central housing 38. More particularly, the central housing 38 includes first and second end walls 40 and first and second sidewalls 42. A rocker 44 is received in and pivotally connected to the central housing 38. More specifically, the rocker 44 pivots about a pivot pin or trunnion 46 including opposing ends welded in apertures 48 in the two end walls 40 of the central housing 38. As a result of this arrangement the rocker 44 pivots freely from side to side with respect to the central housing 38. Advantageously, the pivot pin or trunnion has a length to diameter ratio of about 7:1 to provide quieter operation.

As best illustrated in FIG. 1, the sidewalls 42 of the central housing 38 each include a series of spaced mounting points 48a-48d. In the illustrated embodiment, the mounting points 48 comprise a first series of vertically spaced apertures in the first sidewall 42 and a second series of vertically spaced apertures in the second sidewall 42.

As further illustrated, each leg 36 includes an outer section 50 and an inner section or mounting wall 52 that nests with and is welded in the outer section 50. Fasteners 54 in the form of bolts are utilized to secure the legs 36 to the sidewalls 42 of the central housing 38. More particularly, the bolts 54 are inserted through any one set of the series of vertically spaced mounting apertures 48a-48d and threadedly engaged in the apertures 56 in the inner section or mounting walls 52 of the legs 36. As should be appreciated, the height of the central housing 38 relative to the legs 36 may be adjusted depending upon which set of the series of vertically spaced mounting apertures 48 is selected to complete the connection.

More specifically, the arched legs 36 have a radius of curvature of between about 17 to about 21 degrees and typically are about 19 degrees. The radius of curvature may be constant or may vary over the length of the legs 36. The arched legs define an arc of between about 45 to about 90 degrees and typically about 60 degrees. Advantageously, the arched base assembly 14 provides not only added strength but also better and more favorable distribution of the trailer weight across the fifth wheel hitch assembly 10 and the towing vehicle (i.e., provides optimum vertical down strength. Further, the arched configuration of the legs delivers loads efficiently through the vehicle frame in a more direct path. Fore/aft loads are delivered in a more compact manner (flaring) and therefore, the mounting assembly 12 may also accommodate a goose neck hitch without modification. Still further, the modular design of the base assembly 14 means that the legs 36 may be utilized with other central housing sections 38 including those not incorporating a rocker 44 (i.e., a lightweight central housing section with stationary trunnions for receiving a head assembly.) and/or those incorporating other structures perhaps more suited for particular towing applications.

As further illustrated, the rocker 44 includes two upstanding posts 58. Each of the posts 58 carries a trunnion 60. As illustrated, the first and second trunnions 60 project outwardly in opposing directions. Each of the trunnions 60 includes an undercut groove 62, the function of which will be described in greater detail below.

In addition, the trunnions 60 are offset by about 0.5 to 1.0 inches and typically about 0.75 inches from the fore-and-aft centerline C of the rocker 44 (see FIG. 6) in the central housing 38. Thus, by selective orienting of the ends of the central housing 38 between the legs 36, the mounting posts or trunnions 60 for the head assembly may be adjusted fore-or-aft relative to the vehicle bed by as much as 1.0 to 2.0 inches. This advantageously provides the operator with a convenient way to adjust load distribution relative to the rear axle of the vehicle.

Figure 2:
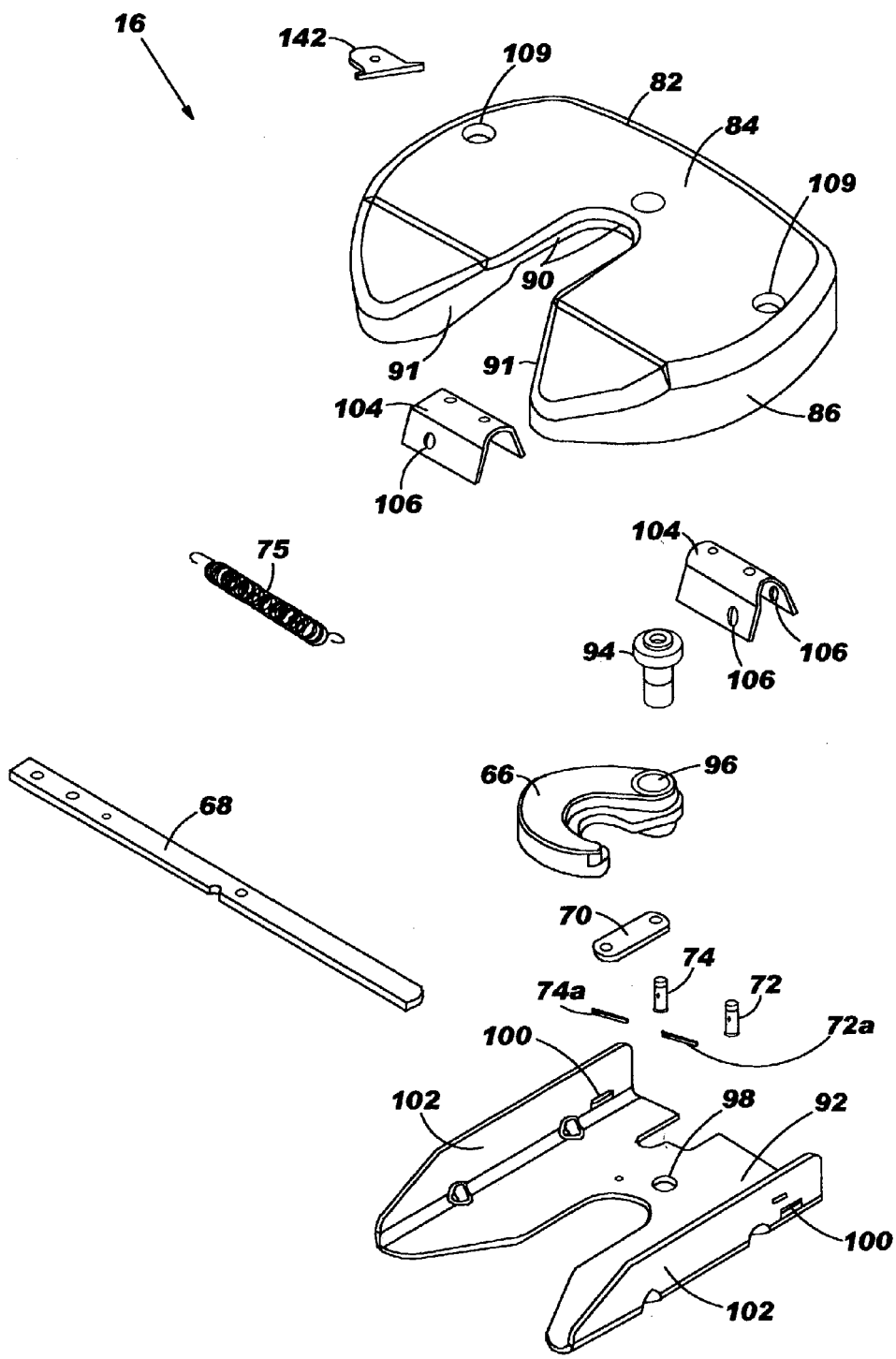
FIG. 2 is a detailed exploded perspective view of the jaw assembly of the present invention.
Figure 3:
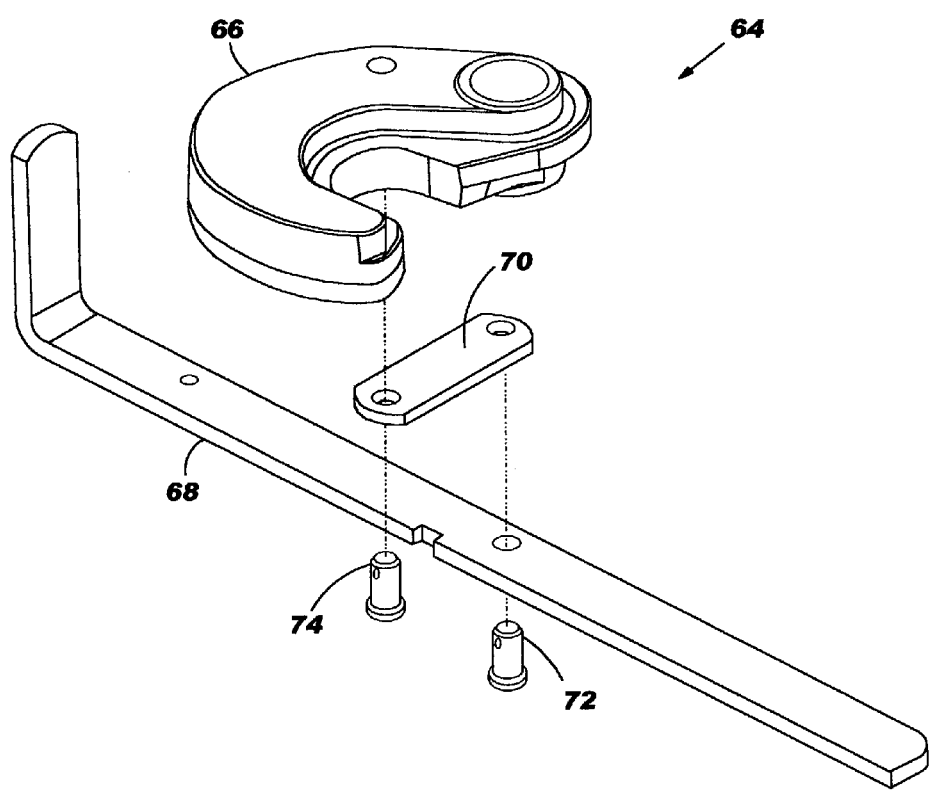
FIG. 3 is an exploded perspective view of the jaw body, control handle, connecting link and pivot pins for connecting those components together.
Figure 4A:
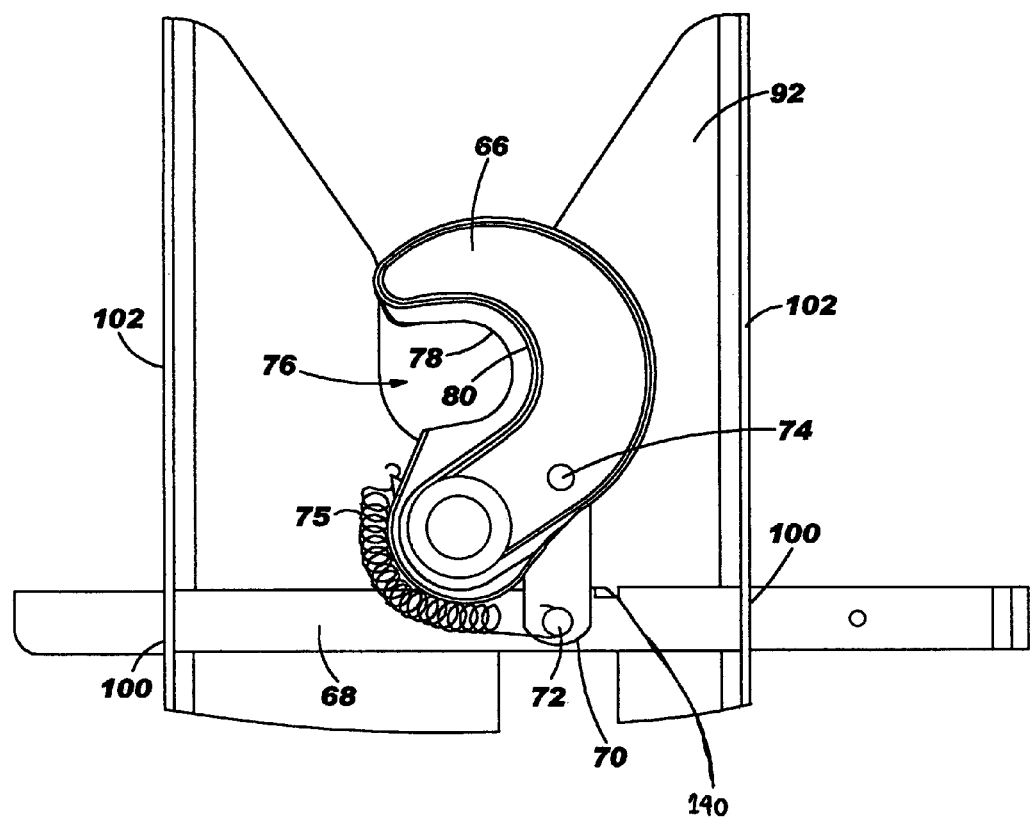
FIGS. 4a and 4b are top plan views illustrating a spring arrangement and showing the jaw in closed and open positions.
Figure 4B:
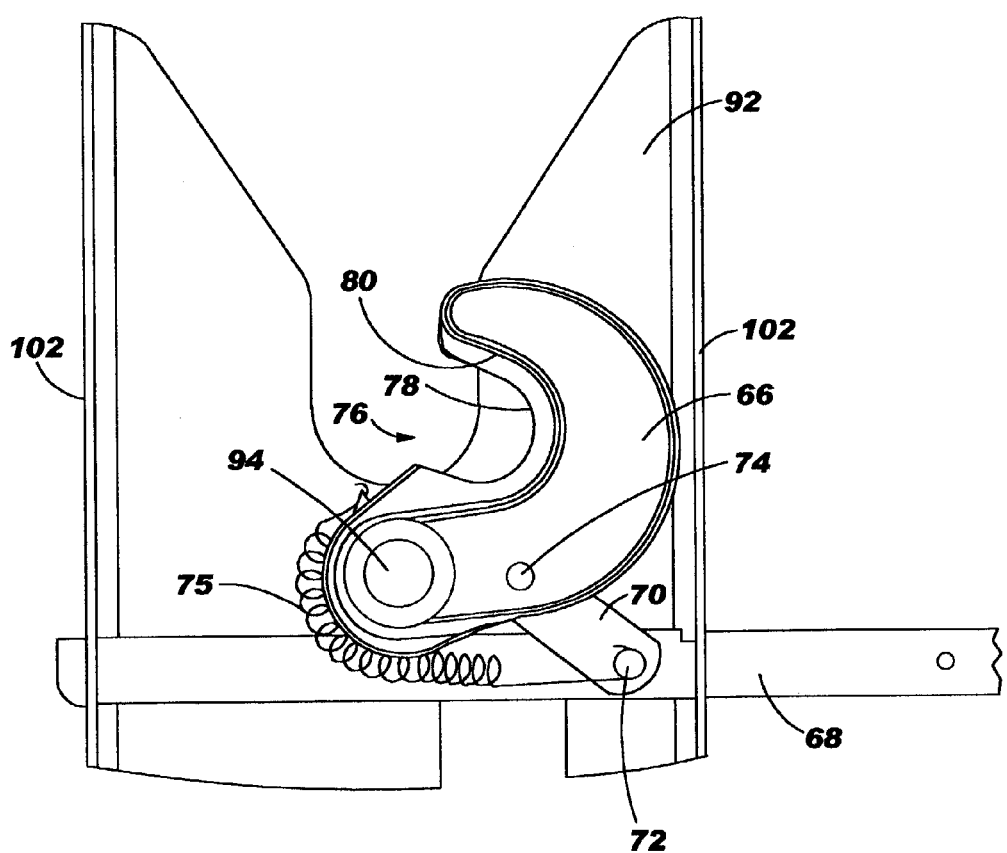

The head assembly 16 includes a locking jaw assembly, generally designated by reference numeral 64 (see FIGS. 2-4b). As best illustrated in FIG. 3, the jaw assembly 64 includes a jaw body 66, a single or multi piece control handle 68 (note fasteners 69 for securing tow piece handle together) and a connecting link 70. A first pivot pin 72 with a cooperating cotter pin 72a connects the connecting link 70 to the control handle 68. A second pivot pin 74 with cooperating cotter pin 74a connects the connecting link 70 to the jaw body 66. A tension spring 75 biases the jaw body 66 into the closed position shown in FIG. 4a. The spring 75 includes a first end connected to the jaw body 66 and a second end connected to the pivot pin 72. In the alternative, the second end of the spring 75 could be connected to the skid plate 82 or even the mounting platform 92. As further illustrated in FIG. 5, the jaw body 66 includes a stepped bearing surface 76. The stepped bearing surface 76 is arcuate and is substantially hook shaped so as to form a king pin receiving slot 81.

Figure 5:
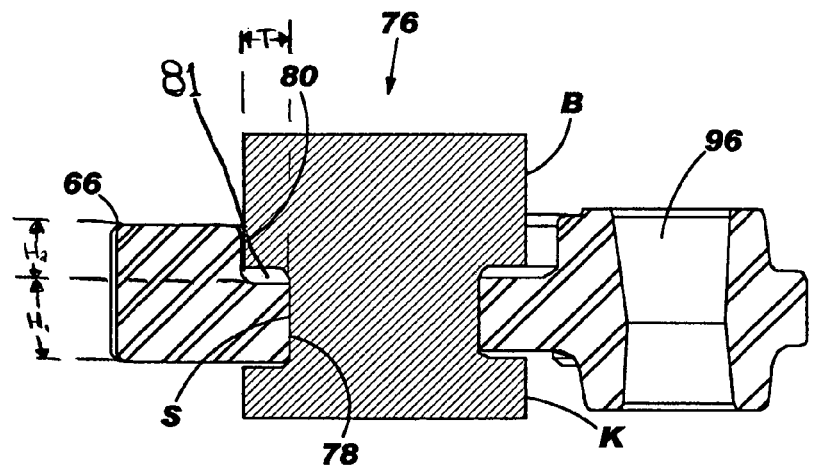
FIG. 5 is a cross sectional view through the jaw body clearly illustrating the stepped bearing surface and how that surface engages the king pin.

As best shown with reference to FIG. 5, the stepped bearing surface 76 includes a first step 78 and a second step 80. The two steps 78, 80 are sized and shaped to provide a larger surface area in engagement with a trailer king pin K when the jaw assembly 64 is closed or latched to secure a trailer to the towing vehicle to which the trailer hitch assembly 10 is mounted. More specifically, the step 78 extends into the groove of the king pin K to engage the stem S while the step 80 is in position to engage the base B of the king pin. Advantageously, this two line engagement between the bearing surface 76 and both the stem S and base B of the king pin K spread the load over a larger surface area thereby reducing strain on the jaw body 66 and the king pin K. The first step 78 may have a height $H_1$ of about 0.56 to about 0.81 inches and a tread T of about 0.375 to about 0.625 inches. The second step 80 may have a height $H_2$ of about 0.43 to about 0.69 inches. Accordingly, a typical stepped bearing surface 76 will have a first step 78 having a height $H_1$ of about 0.69 inches and a tread T of about 0.5 inches and a second step 80 having a height $H_2$ of about 0.56 inches.

Figure 6:
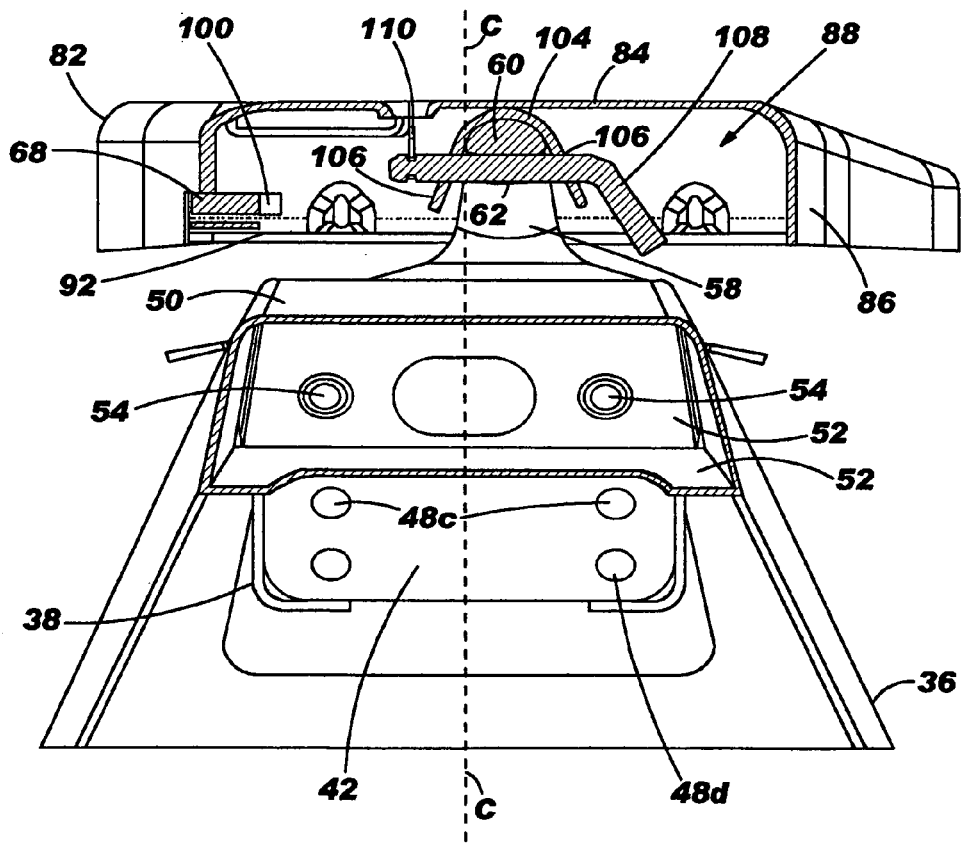
FIG. 6 is a detailed cross sectional view showing the mounting of the head assembly on the base assembly and particularly the receipt of the trunnions in the pivot guides.

As best illustrated in FIGS. 2 and 6 the head assembly 16 includes a skid plate 82. The skid plate 82 has a top wall 84 and an integral downwardly depending peripheral skirt 86 defining a hidden cavity 88 beneath the top wall. A throat 90 functions to receive the king pin K of a trailer. Advantageously, the downwardly depending peripheral skirt 86 extends around the entire throat or king pin engaging envelope 90 in order to provide added strength and rigidity to the skid plate 82 around the king pin. In other words, the resulting rolled edge provides an increased pin bearing area for added strength. A mounting platform 92 is carried by the skid plate 82 and is held in the hidden cavity 88.

It should also be appreciated that the throat 90 is wider at the entry (i.e. about eight to ten inches in width instead of the industry standard six inches). More specifically, the throat is about 2.67 to 3.33 times wider at its entry than at its closed end, thereby tapering from about eight inches in width to three inches in width. This allows the operator to more easily align and connect the towing vehicle to the king pin of a trailer as it provides for a wider, acceptable approach angle: that is, the angle of between 50 to 60 degrees defined between the converging sidewalls 91 of the throat. This is a significant benefit when seeking to connect to a trailer in areas of limited vehicle clearance. Such areas may be encountered in the operator's driveway and/or garage as well as at remote locations such as campsites and trailer parks.

As best illustrated in FIG. 2 the jaw assembly 64 is connected to and carried by the mounting platform 92. More specifically, the jaw body 66 is pivotally secured to the mounting platform 92 by means of a pivot pin 94 that is received in an aperture 96 in the jaw body and secured in an aperture 98 in the mounting platform. The control handle 68 is received for free sliding movement through two slots 100 in opposing walls 102 of the mounting platform 92. During construction, the jaw assembly 64 is mounted to the inner mounting platform 92 and then the mounting platform is welded or otherwise secured to the underside of the skid plate 82 in the cavity 88 where it is hidden from view by the downwardly depending skirt 86. As illustrated, the top wall 84 and skirt 86 are formed from one continuous piece of 50,000 minimum yield draw quality low carbon steel having a thickness of about 0.135 inches that is weldless and seamless. Consequently, the skid plate 82 provides an aesthetically pleasing, smooth, continuous surface that does not require extensive machining during construction and presents a more durable and lasting finish.

Opposing pivot guides 104 are welded between the opposing walls 102 of the inner mounting platform 92 and the skirt 86 of the skid plate 82 (see FIG. 6). The U-shaped pivot guides 104 include opposing apertures 106. When the head assembly 16 is properly seated on the rocker 44, the pivot guides 104 are received over and rest upon the trunnions 60. Connecting pins 108 are then inserted through the aligned apertures 106 in the pivot guides 104 and the grooves 62 in the trunnions 60. Pin clips 110 are then received over the ends of the connecting pins 108 in order to complete the connection. Apertures 109 provided in the skid plate 82 provide a sight path for visually confirming the placement of the pins 108 and clips 110. Advantageously, the rocker 44 pivots about the pivot pin 46 to provide the head assembly 16 with limited side to side pivotal movement while the pivot guides 104 pivot about the trunnions 60 and function to provide the head assembly with limited fore and aft pivotal movement. This allows the head assembly 16 to better support a trailer during towing operations including, for example, during slow speed towing over various terrain contours as might be found at a campsite.

The base assembly 14 is connected to the mounting assembly 12 by means of four feet 112. Two feet 112 are provided on each leg 36. Each foot 112 includes an outer housing 114 having two or more radially directed apertures 116. A ball bearing 118 is received and staked in each aperture 116. A stem actuator 120 is received in the central bore of the outer housing 114. The stem actuator 120 includes a head 122 including multiple cam surface grooves 124, the number of cam surface grooves corresponding to the number of ball bearings 118. As should be appreciated, the cam surface grooves 124 engage the ball bearings 118. A control handle 126 is connected to each stem actuator 120 by placing the end 129 of the actuator through the aperture 127 and securing cooperating nuts 128 and 130 that are tightly threaded onto the end of the stem.

As best illustrated in FIGS. 1 and 8a, the control handles 126 are placed in a first, unlatched position so that a deep end of the cam surface grooves 124 receive the ball bearings 118 which consequently retract inside the apertures 116 in the outer housing 114. This allows the foot 112 to slide freely down into the socket 26 of the mounting assembly 12. Once the foot 112 is fully seated in the cooperating socket 26, the control handle 126 is rotated so that the end of the handle projects through the aperture 132 in the outer wall of the leg 36. In this second, latched position, the relatively shallow end of the cam surface grooves 124 is rotated so as to cause the ball bearings 118 to project from the apertures 116 in the outer housing 114 in such a way that the projecting portion of the ball bearings are received in the race 34 of the socket 26. A padlock or other fastener (not shown) is secured in apertures 134 in the end of the cooperating control handles 126 that control the operation of the locking feet 112 on each leg 36 so that the control handles cannot be pulled back through the aperture 132. In this way the cam surface grooves 124 are locked in a position forcing the ball bearings 118 outwardly from the outer housings 114 of the feet 112 into the races 34 of the cooperating sockets 26. As a result, the base assembly 14 is more snugly secured to the mounting assembly 12 that is anchored to the frame of the towing vehicle.

The operation of the fifth wheel hitch assembly 10 of the present invention will now be briefly summarized. First, the base assembly 14 is constructed by securing the central housing 38 between the legs 36 at the desired height by means of the bolts 54 threaded through the selected mounting points 48. The base assembly 14 is then connected to the mounting assembly 12 by inserting the feet 112 in the sockets 26. The control handles 126 are then rotated so that the ends thereof project through the apertures 132 in the legs 36. As this is done the cam surface grooves 124 are rotated and function to press the ball bearings 118 outwardly through the apertures 116 in the outer housing 114 of the feet so that those ball bearings project into the races 34 of the various sockets 26. Padlocks or pins inserted in the apertures 134 secure the feet 112 in the locked position to thereby provide a reliable connection between the base assembly 14 and the mounting assembly 12.

Next, the head assembly 16 is positioned on the mounting assembly 12. Specifically, the pivot guides 104 are seated on the trunnions 60 with the throat 90 of the head assembly opening toward the rear of the vehicle. The connecting pins 108 are then inserted through the opposing apertures 106 in the pivot guides 104 and the grooves 62 in the trunnions 60. The pin clips 110 are then secured on the ends of the connecting pins 108 in order to complete this connection.

The control handle 68 is then extended outwardly from the skid plate 82 in order to open the jaw assembly 64 with the notch 140 on the handle hooked over the margin of one of the sidewalls 102 surrounding the slot 100. The vehicle is then backed toward the trailer until the king pin is received in the throat 90 of the skid plate 82. When the king pin is fully received and seated in the jaw assembly 64, the engagement of the king pin with the jaw body 66 frees the notch 140 from the margin of the sidewall 102 surrounding the slot 100 and the spring 75 biases the jaw assembly 64 closed. In this position the stepped bearing surface 76 engages the stem S and the base B of the king pin K. A padlock or other pin arrangement (not shown) is then utilized to lock the control handle 68 and, therefore, the jaw assembly 64 in the closed position by inserting the lock through aligned apertures in the control handle 68 and a latching bracket 142 welded to the head assembly 16. The fifth wheel hitch assembly 10 of the present invention is then ready for towing after following appropriate safety checks.

The foregoing description of the preferred embodiment of the invention has been presented for purposes of illustration and description. It is not intended to be exhaustive or to limit the invention to the precise form disclosed. Obvious modifications or variations are possible in light of the above teachings. For example, the legs 36 could include a sliding mechanism to allow for relative fore-and-aft adjustment of the positioning of the head assembly and/or base assembly in the truck bed. Of course, a multi-piece skid plate could be utilized as a substitute for the one-piece skid plate 82 if desired.

The embodiment was chosen and described to provide the best illustration of the principals of the invention and its practical application to thereby enable one of ordinary skill in the art to utilize the invention in various embodiments and with various modifications as are suited the particular use contemplated. All such modifications and variations are within the scope of the invention as determined by the appended claims when interpreted in accordance with the breadth, to which they are fairly, legally and equitably entitled. The drawings and preferred embodiment do not and are not intended to limit the ordinary meaning of the claims and their fair and broad interpretation in any way.

What is claimed is:

1. A fifth wheel hitch assembly, comprising:
   a base assembly; and
   a head assembly carried on said base assembly, said head assembly comprising:
   a skid plate having a top wall and a hidden cavity,
   a mounting platform carried by said skid plate and held in said hidden cavity,
   a jaw assembly carried by said skid plate and held in said hidden cavity, and
   a pair of opposed pivot guides directly attached to said top wall along a single axis extending within said hidden cavity, wherein said skid plate and said pivot guides pivot about said axis in a fore and aft direction with respect to said base assembly.

2. The fifth wheel hitch assembly of claim 1, wherein said skid plate includes (a) a downwardly depending peripheral skirt defining said hidden cavity beneath said top wall and (b) a throat for receiving a king pin of a trailer, said downwardly depending peripheral skirt extending around said throat.

3. The fifth wheel hitch assembly of claim 1, wherein said jaw assembly includes a jaw pivotably mounted to said mounting platform, a control handle and a link for pivotably connecting said control handle to said jaw, said jaw being displaceable by manipulation of said control handle between a first position for locking a trailer king pin in said head assembly and a second position for releasing said trailer king pin from said head assembly.

4. The fifth wheel hitch assembly of claim 3, wherein said jaw includes a semicircular king pin gripping surface, a first aperture and a second aperture.

5. The fifth wheel hitch assembly of claim 4, wherein said king pin gripping surface is stepped.

6. The fifth wheel hitch assembly of claim 4, wherein a first pivot pin is received in said first aperture and pivotably connects said jaw to said mounting platform and a second pivot pin is received in said second aperture and connects said jaw to said connecting link.

7. The fifth wheel hitch assembly of claim 6, wherein a third pivot pin pivotably connects said connecting link to an intermediate portion of said control handle.

8. The fifth wheel hitch assembly of claim 7 further including a spring having a first end connected to said jaw and a second end connected to one of said mounting platform and said skid plate, said spring biasing said jaw into said first position.

9. A fifth wheel hitch assembly, comprising:
a base assembly; and
a head assembly carried on said base assembly, said head assembly comprising:
a skid plate with a hidden cavity,
a mounting platform carried by said skid plate and held in said hidden cavity,
a jaw assembly carried by said skid plate and held in said hidden cavity, and
a pair of opposed pivot guides directly attached to said skid plate and held in said hidden cavity, wherein said pivot guides pivot about said base assembly in a fore and aft direction,
wherein said jaw assembly and said pair of opposed pivot guides are connected to said mounting platform.

10. The fifth wheel hitch assembly of claim 9, wherein said mounting platform includes a first upstanding sidewall and a second upstanding sidewall.

11. The fifth wheel hitch assembly of claim 10, wherein a first pivot guide of said pair of pivot guides is mounted to said first upstanding sidewall and said skirt and a second pivot guide of said pair of pivot guides is mounted to said second upstanding sidewall and said skirt.

12. The fifth wheel hitch assembly of claim 11, wherein said base assembly includes a first trunnion engaging said first pivot guide and a second trunnion engaging said second pivot guide.

13. The fifth wheel hitch assembly of claim 12, wherein said first pivot guide includes a first set of opposed apertures and said second pivot guide includes a second set of opposed apertures.

14. The fifth wheel hitch assembly of claim 13, further including a first connecting pin received in said first set of apertures and capturing said first trunnion in said first pivot guide and a second connecting pin received in said second set of apertures and capturing said second trunnion in said second pivot guide.

15. The fifth wheel hitch assembly of claim 14, wherein said first trunnion includes a first groove receiving said first connecting pin and said second trunnion includes a second groove receiving said second connecting pin.

16. The fifth wheel hitch assembly of claim 15, wherein said base assembly includes a first leg, a second leg and a central housing.

17. The fifth wheel hitch assembly of claim 16, wherein said base assembly further includes a rocker pivotably connected to said central housing.

18. The fifth wheel hitch assembly of claim 17, wherein said central housing includes a first end wall, a second end wall, a first sidewall and a second side wall.

19. The fifth wheel hitch assembly of claim 18, wherein a rocker pivot pin pivotably connects said rocker to said first and second end walls so as to allow said rocker to pivot freely from side-to-side.

20. The fifth wheel hitch assembly of claim 17, wherein said first trunnion and said second trunnion are carried on said rocker.

21. The fifth wheel hitch assembly of claim 16, wherein (a) said central housing includes a first side wall having a first series of spaced mounting points and a second side wall having a second series of spaced mounting points; (b) said first leg has a first mounting wall; and (c) said second leg has a second mounting wall.

22. The fifth wheel hitch assembly of claim 21, further including a first fastener for securing at least a first mounting point of said first series of spaced mounting points to said first mounting wall and a second fastener for securing at least a second mounting point of said second series of spaced mounting points to said second mounting wall whereby height adjustment is possible.

23. The fifth wheel hitch assembly of claim 16, wherein said first leg includes a first pair of mounting feet and said second leg includes a second pair of mounting feet.

24. The fifth wheel hitch assembly of claim 23, further including a mounting assembly having a first mounting bracket, a second mounting bracket, a first cross bar extending between said first and second mounting brackets and a second cross bar extending between said first and second mounting brackets.

25. The fifth wheel hitch assembly of claim 24, wherein said first cross bar carries a first pair of mounting sockets and said second cross bar carries a second pair of mounting sockets.

26. The fifth wheel hitch assembly of claim 25, wherein said first and second pair of mounting feet are received in said first and second pair of mounting sockets.

* * * * *